(12) United States Patent
Mori

(10) Patent No.: US 8,982,388 B2
(45) Date of Patent: Mar. 17, 2015

(54) INFORMATION PROCESSING APPARATUS THAT DISPLAYS OPERATION SCREEN AND CONTROL METHOD THEREFOR

(75) Inventor: Ryuta Mori, Yokohama (JP)

(73) Assignee: Canon Kabushiki Kaisha (JP)

( * ) Notice: Subject to any disclaimer, the term of this patent is extended or adjusted under 35 U.S.C. 154(b) by 33 days.

(21) Appl. No.: 13/450,937

(22) Filed: Apr. 19, 2012

(65) Prior Publication Data

US 2012/0268784 A1 Oct. 25, 2012

(30) Foreign Application Priority Data

Apr. 19, 2011 (JP) ................................. 2011-092971

(51) Int. Cl.
| | |
|---|---|
| *G06F 3/12* | (2006.01) |
| *H04N 1/00* | (2006.01) |
| *H04N 1/32* | (2006.01) |

(52) U.S. Cl.
CPC ....... *H04N 1/00244* (2013.01); *H04N 1/00432* (2013.01); *H04N 1/00464* (2013.01); *H04N 1/00474* (2013.01); *H04N 1/00477* (2013.01); *H04N 1/32117* (2013.01); *H04N 2201/3212* (2013.01); *H04N 2201/3273* (2013.01); *H04N 1/00411* (2013.01); *H04N 2201/001* (2013.01); *H04N 2201/0094* (2013.01); *H04N 2201/3278* (2013.01); *H04N 2201/3219* (2013.01)
USPC .......................... 358/1.15; 358/1.14; 718/100

(58) Field of Classification Search
None
See application file for complete search history.

(56) References Cited

U.S. PATENT DOCUMENTS

| | | | | |
|---|---|---|---|---|
| 7,263,664 | B1 * | 8/2007 | Daughtrey | 715/764 |
| 7,392,510 | B1 * | 6/2008 | Treder et al. | 717/128 |
| 7,571,111 | B2 * | 8/2009 | Ahrens et al. | 705/7.42 |
| 8,018,610 | B2 * | 9/2011 | Mathieson et al. | 358/1.15 |
| 8,094,329 | B2 * | 1/2012 | Hirama | 358/1.14 |
| 8,250,228 | B1 * | 8/2012 | Johansson | 709/231 |
| 8,595,727 | B2 * | 11/2013 | Nakahara | 718/100 |
| 8,654,383 | B2 * | 2/2014 | Sugimoto | 358/1.15 |
| 8,736,901 | B2 * | 5/2014 | Kusakabe | 358/1.9 |
| 2005/0216331 | A1 * | 9/2005 | Ahrens et al. | 705/11 |
| 2006/0250645 | A1 * | 11/2006 | Miyazaki | 358/1.15 |
| 2007/0094109 | A1 * | 4/2007 | Perry | 705/32 |
| 2008/0077936 | A1 * | 3/2008 | Goel et al. | 719/312 |

FOREIGN PATENT DOCUMENTS

JP 2006-127503 A 5/2006

* cited by examiner

*Primary Examiner* — Ashish K Thomas
(74) *Attorney, Agent, or Firm* — Rossi, Kimms & McDowell LLP

(57) ABSTRACT

An information processing apparatus that is capable of controlling a screen appropriately even when a screen is switched while processing a job. A Web browser receives screen data from an external apparatus, displays an operation screen based on the screen data, transfers a processing instruction based on a user's operation on the operation screen to a service provider, and transmits a job executed result according to the processing instruction to the external apparatus. The service provider executes the job according to the processing instruction transmitted from the Web browser, and transmits the result of the executed job to the Web browser. The Web browser displays a completion screen with a different tab from the operation screen when another user's operation is performed while executing the job, and displays the completion screen with the same tab as the operation screen when another user's operation is not performed while executing the job.

4 Claims, 8 Drawing Sheets

FIG.6
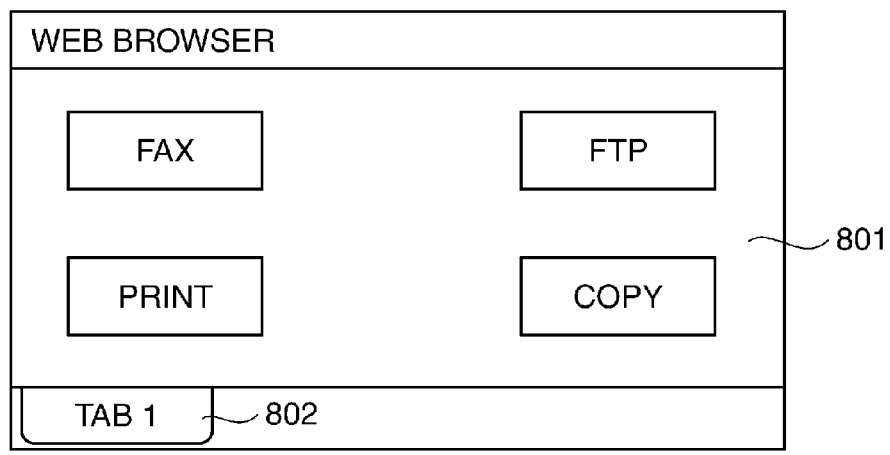
FIG.7
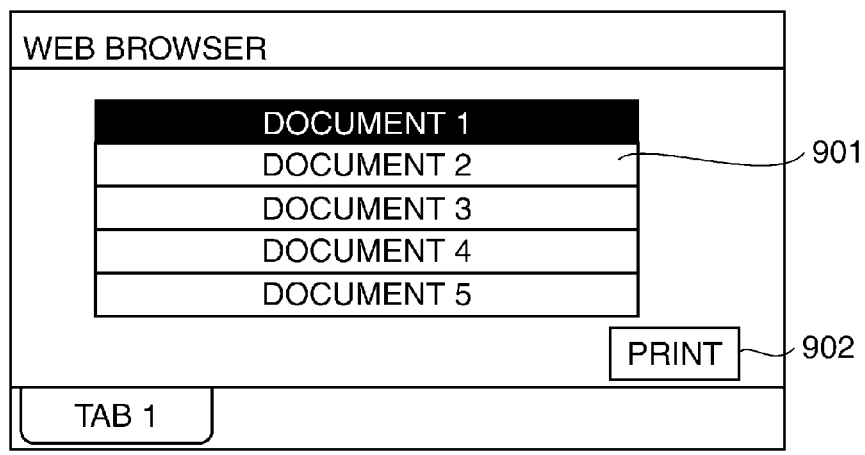
FIG.8
RESPONSE FROM WEB APPLICATION (HTTP HEADER)
X-meapweb- SequentialControl: sequence=on,sequenceNo=1124533252
                    701                  702              703

RESPONSE FROM WEB APPLICATION (HTTP HEADER)
X-meapweb- SequentialControl:
sequence=on,sequenceNo=1124533252 ,
windowopen=on
　　　　〜
　　　1401

INFORMATION PROCESSING APPARATUS THAT DISPLAYS OPERATION SCREEN AND CONTROL METHOD THEREFOR

BACKGROUND OF THE INVENTION

1. Field of the Invention

The present invention relates to an information processing apparatus that displays an operation screen provided from an external apparatus, and a control method therefor.

2. Description of the Related Art

An information processing apparatus, such as a PC, can display operation screens provided from an external apparatus like a Web server connected via a network on a Web browser of the information processing apparatus.

When displaying an operation screen, the Web browser of the information processing apparatus requests the operation screen from the Web server first. Then, a Web application on the Web server sends an HTML file for displaying an operation screen on the Web browser to the information processing apparatus in response to the request concerned. The Web browser of the information processing apparatus analyzes the HTML file received, and displays the operation screen based on descriptions of the HTML file.

Furthermore, when a user inputs an instruction through the operation screen displayed on the Web browser, the Web browser notifies the Web server of the inputted instruction. Receiving the notification, the Web application on the Web server executes a process according to the inputted instruction.

Incidentally, some MFPs (multifunctional peripheral devices) as an information processing apparatus that is provided with a scanner and a printer are provided with the Web browser mentioned above. Such an MFP displays an operation screen provided from the Web server on the Web browser of the MFP by following the above-mentioned procedure, and receives various instructions from the user.

In addition, some Web servers provide operation screens to which instructions to use functions of the MFP are inputted. Japanese Laid-Open Patent Publication (Kokai) No. 2006-127503 (JP 2006-127503A) discloses that a user of an MFP inputs instructions to the MFP via an operation screen displayed on a Web browser. Then, the Web browser of the MFP notifies a Web server of the inputted instructions.

When receiving the notification concerned, the Web server requests that the MFP executes various processes according to the contents of the instructions inputted by the user. Then, the MFP executes the requested processes. This eliminates the need for holding data of all the operation screens for operating the MFP by the MFP. The data of the operation screens can be easily changed on the Web server.

Incidentally, when an MFP executes a printing process according to an operation through an operation screen provided from a Web server, a user may switch to another operation screen without waiting to display a print completion screen in the middle of the printing process. For example, it is assumed that the user instructs to switch to another operation screens in the middle of the printing process and is operating for executing another job. When the print completion screen of the printing process previously executed is displayed during this operation, the print completion screen about the print job instructed in the past is suddenly displayed in spite of the fact that the user has already operated for executing another job, which confuses the user.

SUMMARY OF THE INVENTION

The present invention provides an information processing apparatus and a control method therefor, which are capable of controlling a screen appropriately even when a screen is switched while processing a job.

Accordingly, a first aspect of the present invention provides an information processing apparatus comprising a Web browser configured to receive screen data from an external apparatus on a network, to display an operation screen based on the screen data received, to transfer a processing instruction based on a user's operation on the displayed operation screen to a service provider, and to transmit a result of a job executed according to the transferred processing instruction to the external apparatus, and the service provider configured to execute the job according to the processing instruction transmitted from the Web browser, and to transmit the result of the executed job to the Web browser, wherein the Web browser displays a completion screen with a different tab from the operation screen when another user's operation is performed while executing the job, and displays the completion screen with the same tab as the operation screen when another user's operation is not performed while executing the job.

Accordingly, a second aspect of the present invention provides a control method for an information processing apparatus comprising a step of receiving screen data from an external apparatus on a network, a step of displaying an operation screen based on the screen data received, a step of executing a job according to a user's operation on the operation screen, a step of transmitting a result of the job executed to the external apparatus, a step of receiving screen data showing a completion screen corresponding to the transmitted result of the job from the external apparatus, a step of displaying the completion screen with a different tab from the operation screen when another user's operation is performed while executing the job, and a step of displaying the completion screen with the same tab as the operation screen when another user's operation is not performed while executing the job.

According to the present invention, the screen is appropriately controllable even when the screen is switched while processing a job.

Further features of the present invention will become apparent from the following description of exemplary embodiments with reference to the attached drawings.

BRIEF DESCRIPTION OF THE DRAWINGS

FIG. 6 is a view showing an example of a menu screen displayed by a Web browser of the information processing apparatus (MFP).

FIG. 7 is a view showing an example of a document selection screen displayed by the Web browser.

FIG. 8 is a view showing an example of a second sequence setting embedded in an HTTP header by a Web application of the server.

DESCRIPTION OF THE EMBODIMENTS

Hereafter, an example of an image processing apparatus according to an embodiment of the present invention will be described with reference to the attached drawings. It should be noted that the following embodiment does not restrict the scope of the invention defined by the claims. The combination of all the features of the embodiment is not necessarily indispensable to the solving means of the invention.

Figure 1:
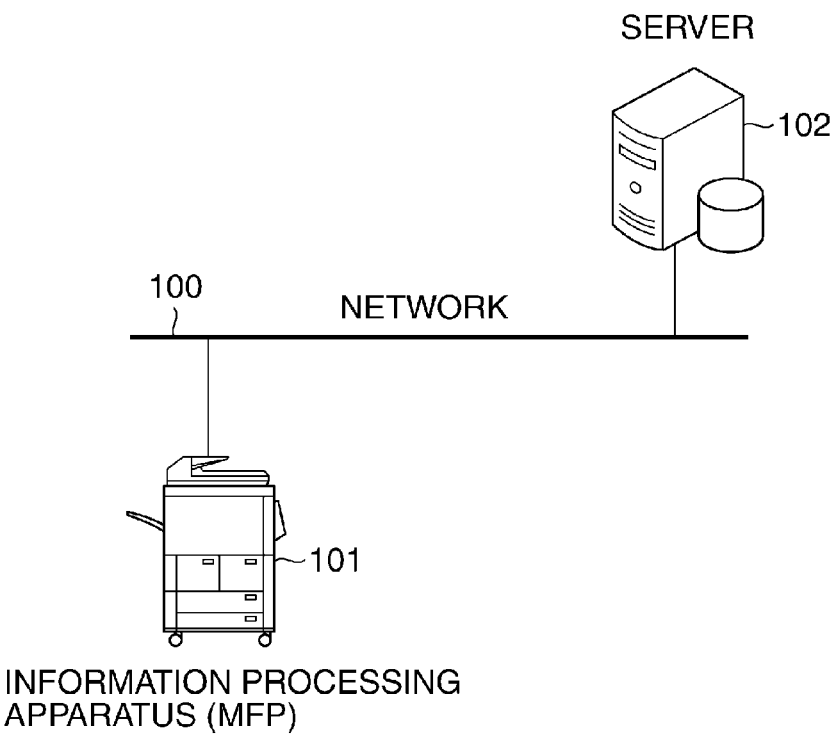
FIG. 1 is a view showing an example of a network system in which an information processing apparatus (MFP) according to a first embodiment of the present invention is accommodated.

FIG. 1 is a view showing an example of a network system in which an information processing apparatus according to a first embodiment of the present invention is accommodated. In the illustrated example, an information processing apparatus 101 is connected to a server (Web server) 102 as an external apparatus via a network 100. The information processing apparatus 101 is an MFP (multifunctional peripheral device), for example. The network 100 is an infrastructure that enables communication between the information processing apparatus 101 and the server 102. For example, the network 100 is an intranet or the Internet.

The information processing apparatus 101 has a function of a Web browser, and the server 102 has a function to distribute Web contents via the network 100. The server 102 sends Web contents to the information processing apparatus 101 in response to a request from the information processing apparatus 101.

Figure 2:
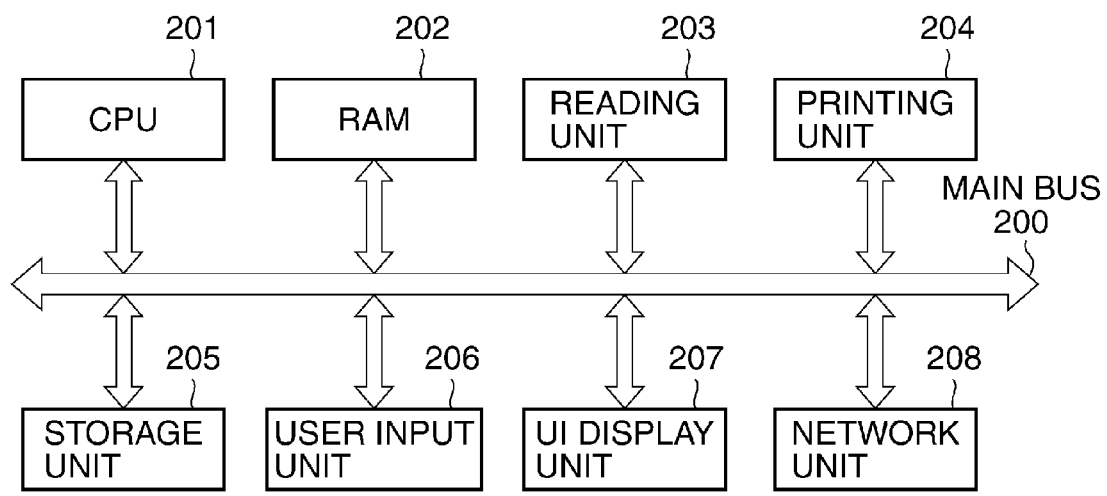
FIG. 2 is a block diagram schematically showing an example of a configuration of the information processing apparatus (MFP).

FIG. 2 is a block diagram showing an example of the configuration of the information processing apparatus 101 shown in FIG. 1.

In FIG. 2, the information processing apparatus 101 has a CPU 201. The CPU 201 manages the entire control of the information processing apparatus 101. The information processing apparatus 101 is provided with a RAM 202 used as a work area of the CPU 201, a reading unit 203 that reads an image from an original, and a printing unit 204 that prints according to image data. The information processing apparatus 101 is provided with a storage unit 205, a user input unit 206, a UI (user interface) display unit 207, and a network unit 208. Then, the CPU 201, the RAM 202, the reading unit 203, the printing unit 204, the storage unit 205, the user input unit 206, the UI display unit 207, and the network unit 208 are mutually connected via a main bus 200.

The storage unit 205, which is an HDD or an NVRAM for example, stores programs and information about various settings. The user input unit 206 is used when a user inputs a command, and the UI display unit 207 displays various kinds of screens. The network unit 208 communicates with an external device (for example, the server 102) via the network 100. In the illustrated example, the CPU 201 controls the RAM 202, the reading unit 203, the printing unit 204, the storage unit 205, the user input unit 206, the UI display unit 207, and the network unit 208 via the main bus 200. The UI display unit 207 may double as the user input device 206 using a touch panel display.

Figure 3:
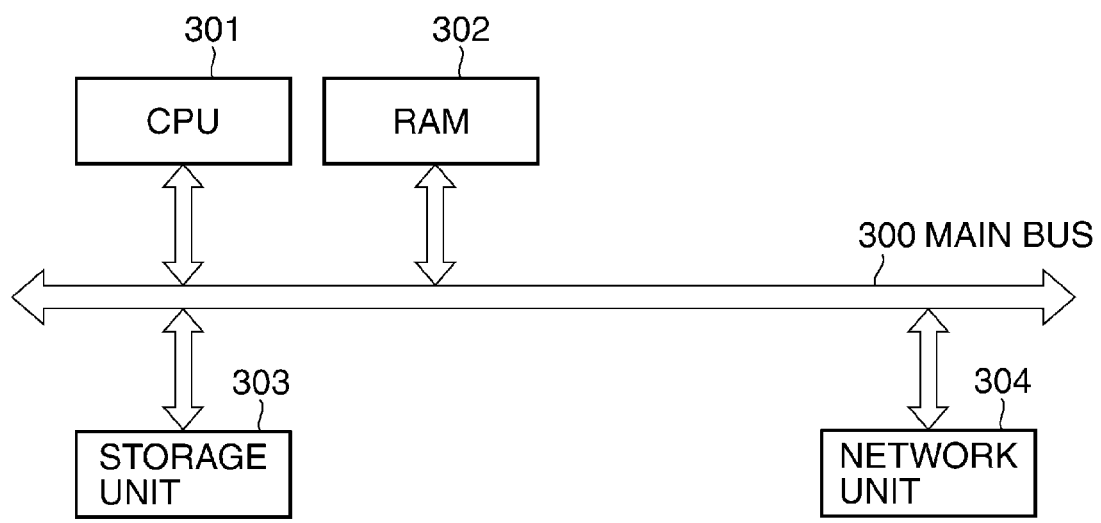
FIG. 3 is a block diagram schematically showing an example of a hardware configuration of the server shown in FIG. 1.

FIG. 3 is a block diagram schematically showing an example of a hardware configuration of the server 102 shown in FIG. 1.

In FIG. 3, the server 102 has a CPU 301, a RAM 302, a storage unit 303, and a network unit 304, which are mutually connected via a main bus 300. The RAM 302 is used as a work area of the CPU 301, and the storage unit 303 stores programs and information about various settings. The network unit 304 communicates with the information processing apparatus 101 via the network 100.

The CPU 301 controls the RAM 302, the storage unit 303, and the network unit 304 via the main bus 300.

Figure 4:
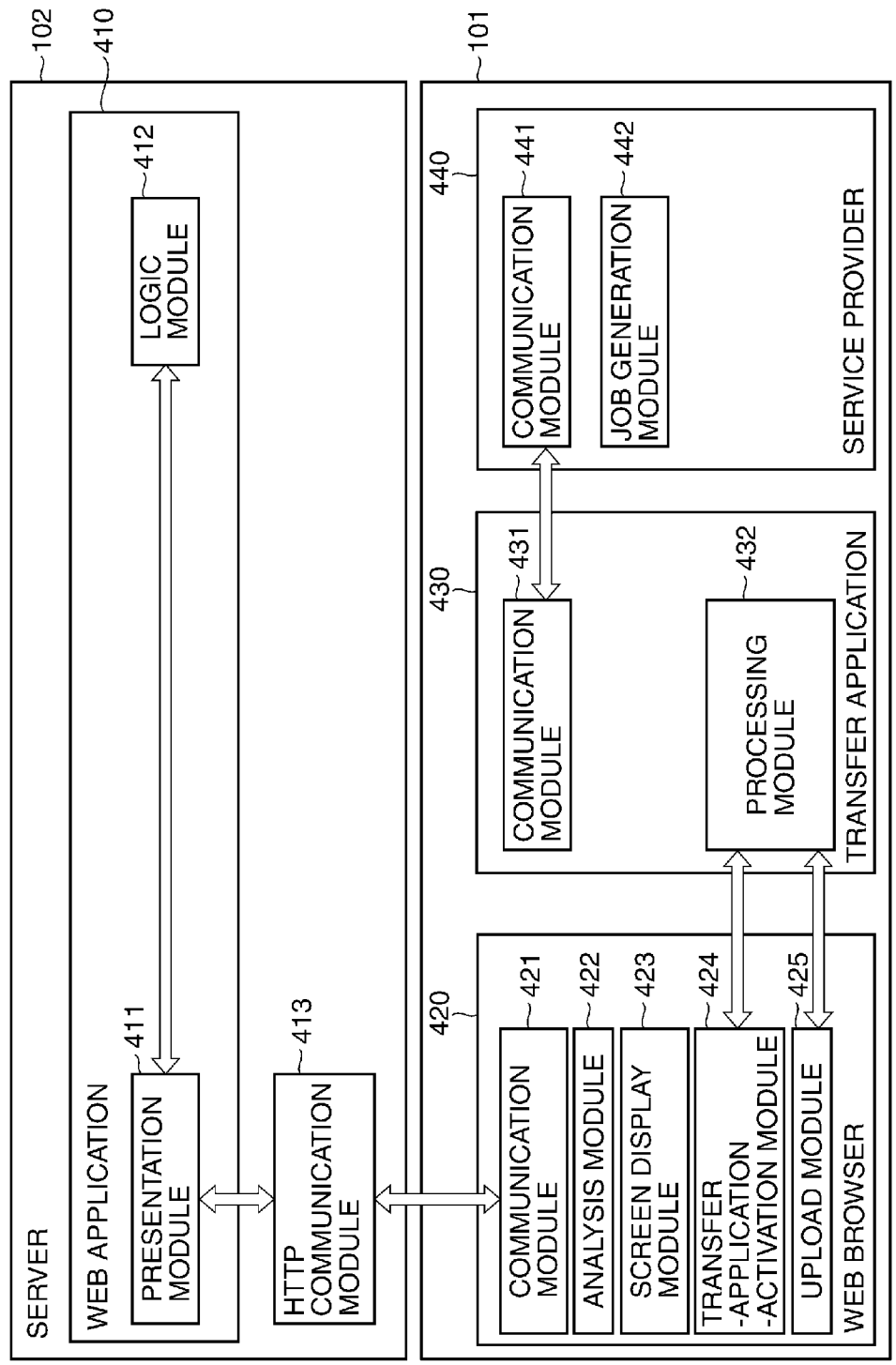
FIG. 4 is a view showing an example of a software configuration of the information processing apparatus (MFP) and the server.

FIG. 4 is a view showing an example of a software configuration of the information processing apparatus 101 and the server 102 shown in FIG. 1. It should be noted that the software (a control program) shown in FIG. 4 is executed by the CPU 201 of the information processing apparatus 101 or the CPU 301 of the server 102.

In FIG. 4, a Web application 410 and an HTTP communication module (referred to as a communication module, hereafter) 413 run on the server 102 (i.e., the CPU 303). The Web application 410 includes a presentation module 411 and a logic module 412.

The presentation module 411 sends an operation screen displayed on the information processing apparatus 101 or a processing request as a response to the information processing apparatus 101 via the communication module 413 in response to a request from the information processing apparatus 101. The presentation module 411 receives input information that is inputted through the operation screen displayed on the information processing apparatus 101 from the information processing apparatus 101 via the communication module 413.

The logic module 412 processes the above-mentioned input information transferred from the presentation module 411. For example, the logic module 412 changes a screen to be displayed according to the input information, and generates a processing request for executing a device functional in the information processing apparatus (MFP) 101.

The communication module 413 is a software module that controls the network device 304 (FIG. 3) to communicate in the HTTP protocol.

The information processing apparatus (referred to as the MFP hereafter) 101 has a Web browser 420, a transfer application 430, and a service provider 440. Each of the Web browser 420, the transfer application 430, and the service provider 440 is executed by the CPU 201 of the MFP 101. It should be noted that the Web browser 420 is not limited to what displays the contents from the server 102. Similarly, the server 102 is not limited to what transmits and receives a request and a response (messages) according to the HTTP protocol (for example, SOAP (Simple Object Access Protocol)). The Web browser 420 must have at least a function to acquire contents by communicating with arbitrary servers and to display a screen.

The Web browser 420 has a communication module 421, an analysis module 422, a screen display module 423, a transfer-application-activation module 424, and an upload module 424. The communication module 421 communicates with the presentation module 411 via the communication module 413 according to the HTTP protocol.

For example, the communication module 421 transmits input information inputted through an operation screen displayed by the Web browser 420 as a request to the Web application 410. Then, the communication module 421 receives the response transmitted from the Web application 410.

The analysis module 422 analyzes the response received from the Web application 410. The response describes HTML data that represents contents of an operation screen displayed by the Web browser 420, and a processing request to the service provider 440. The analysis module 422 verifies whether the Content-Type field included in the header of the response (HTTP response) is "application/vnd.canon.webservice". Then, when the Content-Type field is "application/vnd.canon.webservice", the analysis module 422 requests the transfer-application-activation module 424 to process the received response.

The screen display module 423 displays the HTML data as an operation screen on the UI display unit 207 (FIG. 2) based on the analysis result by the analysis module 422.

The transfer-application-activation module 424 considers that the response received from the Web application 410 according to the analysis result by the analysis module 422 is a processing request to the service provider 440. Then, when it is considered as a processing request to the service provider 440, the transfer-application-activation module 424 requests the transfer application 430 to transmit a processing request to the service provider 440. A method other than referring to the HTTP response header may be used, as long as the method enables to determine whether the above-mentioned response is a processing request to the information processing apparatus 101.

According to a request from a unit (printing unit etc.) of the MFP 101, the upload module 425 transmits the data designated by the request concerned to the server 102 via the communication module 421. Although the illustrated example uploads designated data using the HTTP POST method, another method may be employed as long as the method uses a protocol that can be processed by the Web browser 420.

The transfer application 430 is provided with a communication module 431 and a processing module 432. Receiving a request from the processing module 432, the communication module 431 transfers a processing request to the service provider 440. Then, the communication module 431 receives a processing result to the processing request concerned from the service provider 440.

Receiving a request from the transfer-application-activation module 424, the processing module 432 transfers the processing request to the service provider 440 via the communication module 431. In this case, the processing module 432 transfers the processing request to a destination that is described in the header of the response received from the Web application 420.

The transfer application 430 is able to process a file (a voice file, a movie file, an animation file, etc.) of which format is no supported by the Web browser 420, and operates independently of the Web browser 420. The function to transmit a processing request may exist as a plug-in, a function in the Web browser 420, or a Java (registered trademark) Script described in the received response, not in the transfer application 430.

The service provider 440 has a communication module 441 and a job generation module 442. The communication module 441 receives a processing request from the transfer application 430. Receiving the processing request received by the communication module 441, the job generation module 442 generates a job for executing the process requested, and executes the job concerned.

Figure 5:
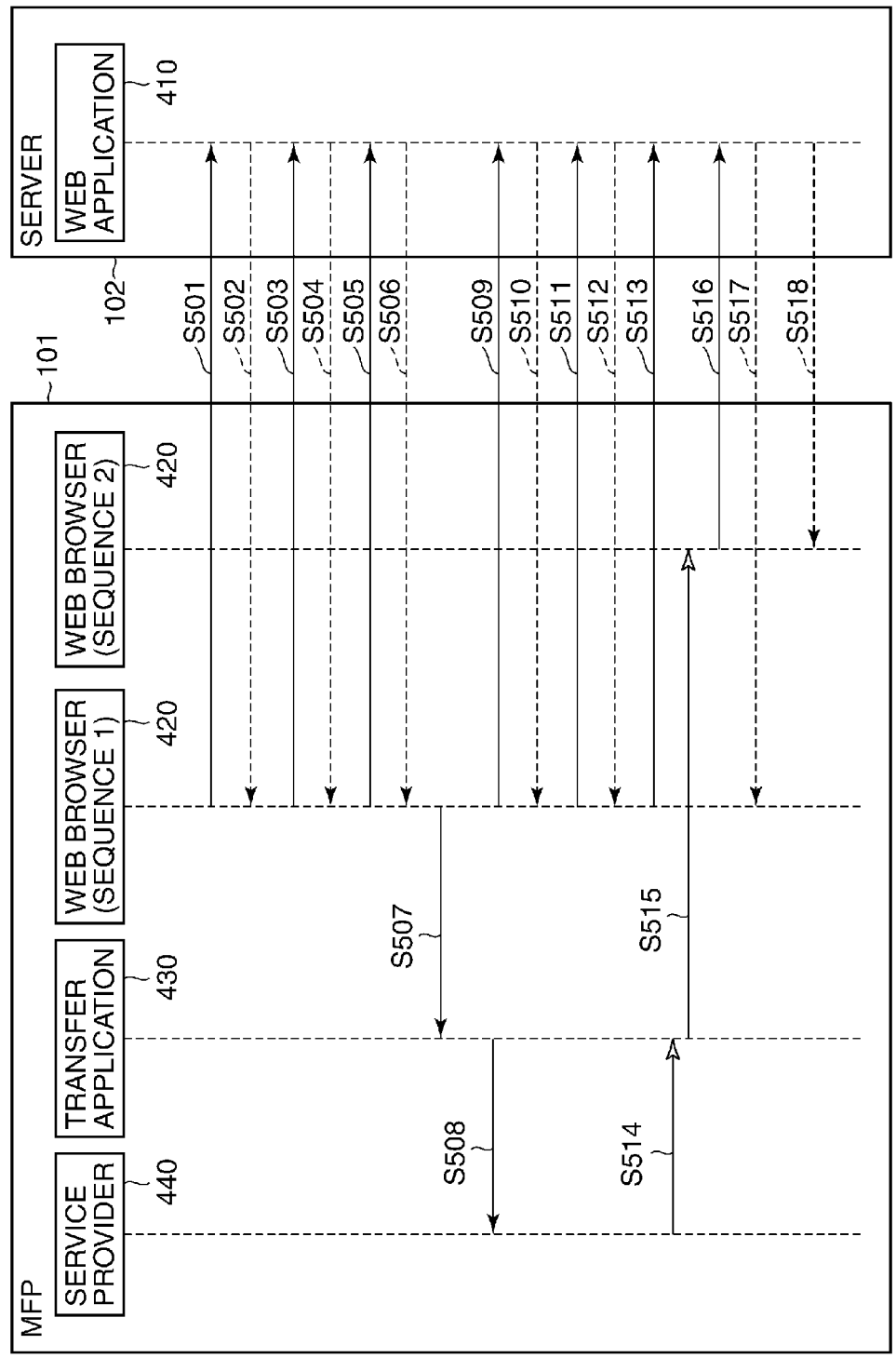
FIG. 5 is a sequential chart for describing processes in the information processing apparatus (MFP) and the server.

FIG. 5 is a sequential chart for describing processes in the information processing apparatus (MFP) 101 and the server 102 shown in FIG. 4.

A second sequence process performed with the illustrated network system will be described with reference to FIG. 3 through FIG. 5. When the MFP 101 is executing the first print job, a user may operate to switch to another operation screen. The second sequence process displays the other operation screen. In this case, a result of one print job is returned (transmitted) to the Web application 411 as another sequence with another sequence number added.

First, when a user pushes down a hardware button for transmission (not shown) using the UI display unit 207, the Web browser 420 is activated. The Web browser 420 requests a menu screen from the Web application 410 in order to display the menu screen for executing a process on the UI display unit 207. Here, a URL for designating contents of the menu screen shall be beforehand set in the MFP 101.

The Web browser 420 requests the contents designated by the URL from the Web application 410 that holds the contents using a GET command of the HTTP (step S501). Specifically, the communication module 421 of the Web browser 420 communicates with the HTTP communication module 413 of the server 102 in the HTTP protocol according to the HTML data. The HTTP communication module 413 passes the HTML data to the suitable Web application 411 according to the received URL. Accordingly, the menu screen is requested from the Web browser 420, and the Web browser 420 is requested by the Web application 410. In the following description, operations of the communication module 421 and the HTTP communication module 413 are omitted.

Subsequently, the Web browser 420 receives the HTML data of the menu screen (the operation screen) as a response provided from the Web application 410, and displays it on the UI display unit 207 (step S502).

FIG. 6 is a view showing an example of the menu screen displayed by the Web browser 420.

Execution menus, such as a FAX, an FTP, a PRINT, and a COPY, are displayed on the menu screen 801. The Web browser 420 is a tab browser that can manage a plurality of screens in units of a tab 802.

When the user pushes down the print menu (PRINT) in the menu screen, the Web browser 420 requests the Web application 410 to generate a print screen (step S503) according to a predetermined sequence (an existing sequence: a first sequence). The Web application 411 generates HTML data for the requested print screen (the first screen), and replies the HTML data concerned to the Web browser 420 as a response (step S504). Then, the Web browser 420 displays the print screen on the UI display unit 207 according to the received HTML data.

FIG. 7 is a view showing an example of a document selection screen displayed by the Web browser 420.

In the document selection screen, a printable document list 901 and a print button 902 that is pushed down when printing a selected document are displayed.

Next, it is assumed that the user selects a "DOCUMENT 1" on the document selection screen, and pushes down the print button 902. This makes the Web browser 420 request the Web application 411 to generate a print command about the selected document (step S505).

When receiving the generation request of the print command (a processing instruction), the Web application 410 determines whether the print command to the MFP 101 should include a second-sequence command (also referred to as a sequence command, a sequence setting, or sequence information) with reference to the second sequence setting (see FIG. 8) set in the server 102. When the second sequence setting is set in the Web application 410, a management screen in the Web application 410 is used.

When the generation request for the print command is received, the Web application 410 embeds a second sequence setting into an HTTP header. The Web application 410 transmits a script that makes the MFP 101 execute printing and HTML data that displays the in-printing screen to the Web browser 420 as a response (step S506).

FIG. 8 is a view showing an example of the second sequence setting embedded in the HTTP header by the Web application 410.

The transfer application 430 analyzes a variable name "Sequential Control" 701 in FIG. 8 and determines whether to respond by the second sequence. A variable "Sequence" 702 represents whether a second-sequence-setting function is ON or OFF, and is set to "ON" (a new-sequence setting) in the illustrated example. A variable "Sequence No" 703 represents a sequence number that should be set in the Web browser 420 by the Web application 410 when the Web application 410 receives a response as a second sequence.

As mentioned above, when the Web application 410 sends the sequence setting, the script instruction, and the response including screen display data to the Web browser 420, the Web browser 420 displays an HTML screen according to the response concerned.

Figure 9:
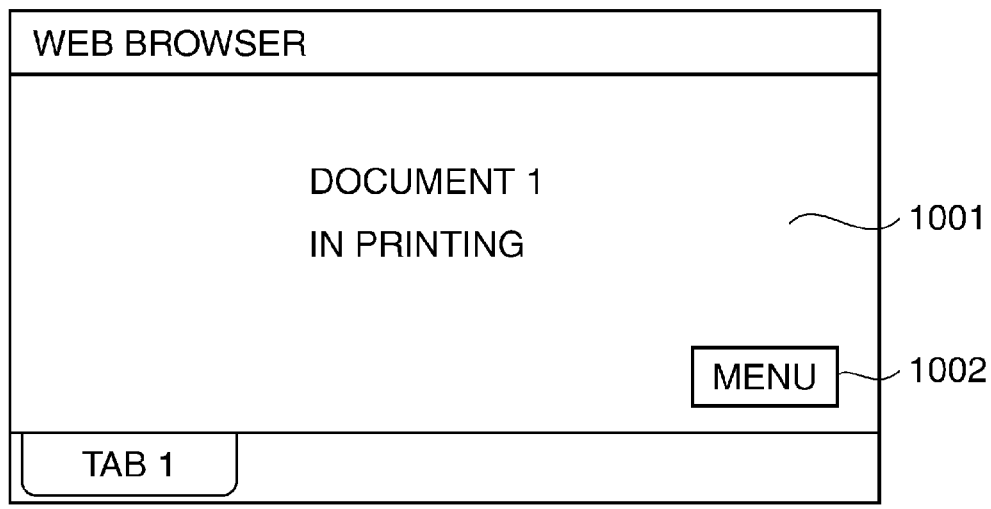
FIG. 9 is a view showing an in-printing screen displayed by the Web browser during a printing process of the MFP.

FIG. 9 is a view showing an in-printing screen displayed by the Web browser 420 during a printing process of the MFP 101.

As shown in FIG. 9, a document name 1001 on printing (under job execution) and a menu button 1002 for changing to a menu screen are displayed on the in-printing screen. A second sequence setting and a script are sent to the transfer application 430 from the Web browser 420 (step S507).

The transfer application 430 interprets the second sequence setting first, and stores the designated setting in the storage unit 205 (FIG. 2). The transfer application 430 analyzes the contents of the script and transmits the analysis result to the service provider 440 (step S508).

Next, an operation when there is a request to change the screen to another operation screens will be described. It is assumed that the user pushed down the menu button 1002 in the in-printing screen shown in FIG. 9 during the printing process in the service provider 440 after transmitting the second sequence setting and the script to the transfer application 430. Hence, the Web browser 420 requests the menu screen from the Web application 410 (step S509). When accepting the request concerned, the Web application 410 transmits the HTML data of the menu screen to the Web browser 420 as a response (step S510). The Web browser 420 displays the received menu screen on the UI display unit 207. The user pushes down the "PRINT" button in the menu screen.

Hence, the Web browser 420 requests the document selection screen from the Web application 410 (step S511). Then, when receiving the request of the document selection screen, the Web application 410 transmits the HTML data of the document selection screen to the Web browser 420 as a response (step S512).

Figure 10:
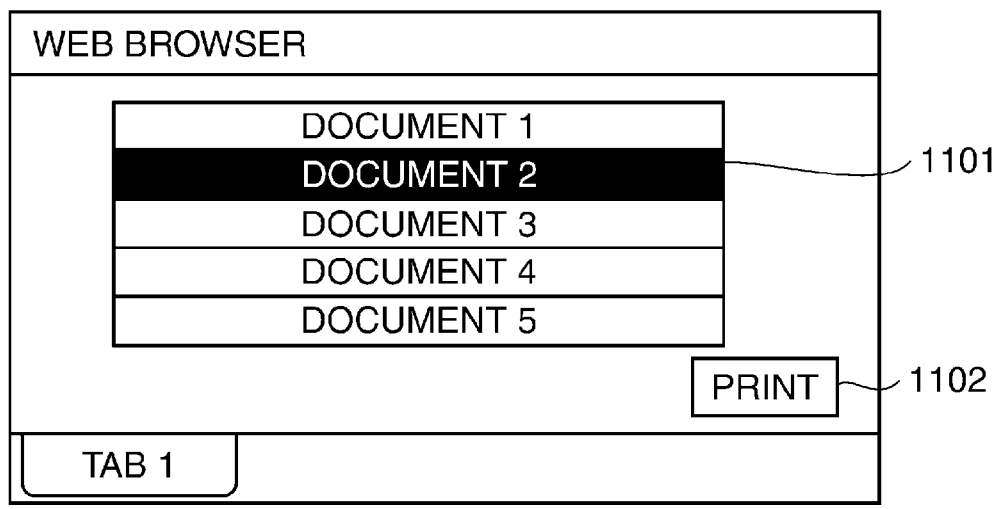
FIG. 10 is a view showing another example of the document selection screen displayed by the Web browser.

FIG. 10 is a view showing the document selection screen displayed by the Web browser 420 in the step 512 shown in FIG. 5.

In FIG. 10, a document list 1101 in which printable documents are listed is displayed in the document selection screen.

A print button 1102 that is pushed down when printing a selected document is displayed in the document selection screen. This time, it is assumed that the user selects the "DOCUMENT 2" on the document selection screen and pushes down the print button 1102. Hence, the Web browser 420 requests so that the Web application 411 executes the print command (step S512). In this time, it is assumed that the "DOCUMENT 1" has been printed and the service provider 440 has transmitted a completion notification (a print completion notification) to the transfer application 430 (step S514). Receiving the completion notification, the transfer application 430 verifies the second sequence setting.

Figure 11:
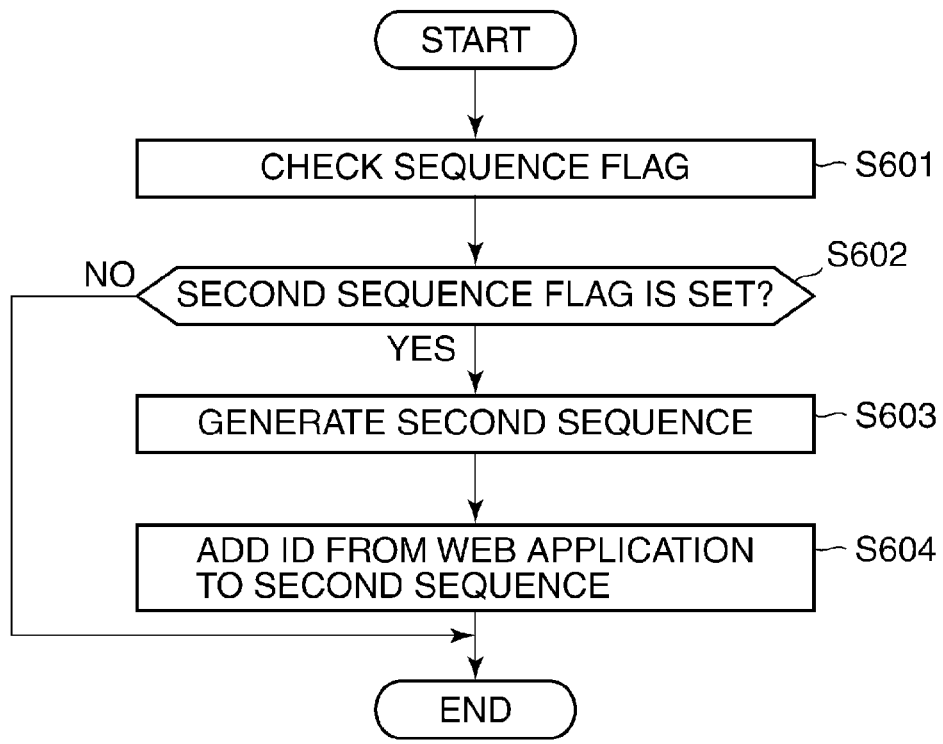
FIG. 11 is a flowchart showing a second sequence process executed by the MFP.

FIG. 11 is a flowchart showing the second sequence process executed by the MFP 101 shown in FIG. 4.

First, the transfer application 430 (i.e., the processing module 432) checks the second sequence setting (i.e., a set value of a second sequence flag) that the Web application 410 sent when the job was executed (step S601). Then, the transfer application 430 determines whether the second sequence flag is set (step S602). When the second sequence flag is not set (NO in the step S602), the transfer application 430 finishes the second sequence process. That is, the print completion notification is not transmitted to the server 102.

On the other hand, when the second sequence flag is set (YES in the step S602), the transfer application 430 generates a second sequence (step S603). Then, the transfer application 430 adds a unique ID, which is set by the Web application 410, to the generated second sequence (step S604), and finishes the second sequence process.

After finishing the second sequence process shown in FIG. 11, the transfer application 430 opens a second tab to the Web browser 420, and generates a new sequence (a sequence 2) (step S515).

Subsequently, the Web browser 420 transmits a processing result of a job as a response to the Web application 410 of the server 102 using the new sequence (step S516). Receiving the processing result, the Web application 410 transmits HTML data of a completion screen to the Web browser 420 using the new sequence (step S518).

Figure 12:
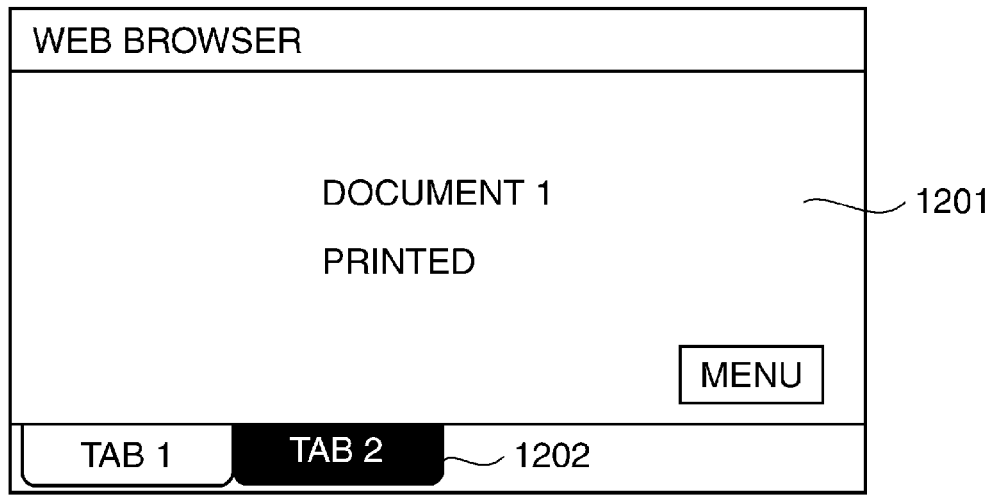
FIG. 12 is a view showing an example of a completion screen of a "DOCUMENT 1" displayed by the Web browser using a new sequence.

FIG. 12 is a view showing an example of the completion screen for the "DOCUMENT 1" displayed by the Web browser 420 using the new sequence.

In FIG. 12, a message 1201 showing that the "DOCUMENT 1" has been printed is displayed on the completion screen. In the completion screen, a screen "TAB 2" 1201 that is different from the screen "TAB 1" of the existing sequence is newly created and is displayed.

As a response to the request in the step S513, the Web application 410 transmits HTML data of an in-printing screen for a "DOCUMENT 2" to the Web browser 420 in step S517. In this case, the existing sequence (sequence 1) is used.

It should be noted that the process in the steps S509 through S513 is executed when another operation screen is requested to display (when the menu button 1002 in FIG. 9 is pushed) during the printing process by the service provider 401 based on the transmitted processing instruction. When another operation screen is not requested to display during the printing operation, the completion notification of a job is transmitted to a server according to the predetermined sequence (the sequence 1), i.e., the same sequence as the sequence of the process in the steps S501 through S506. Therefore, it becomes unnecessary to generate a new sequence.

Thus, in the first embodiment, since the notification (transmission of a job result) to the Web application 410 when the process in the MFP 101 is completed employs the existing sequence (sequence 1) and the second sequence (sequence 2), a parallel processing becomes possible and the mutual interference between the two processes can be prevented. Since the screen tabs are separately displayed with the processes, a user can be prevented from getting confused operationally.

Subsequently, an example of an information processing apparatus according to a second embodiment of the present invention will be described. It should be noted that the configurations of the information processing apparatus (MFP) 101 and the server 102 in the second embodiment are the same as that shown in FIG. 2 through FIG. 4. Here, the transfer application 430 determines whether a second sequence should be generated according to the state of the UI display unit 207.

Figures 13, 14:
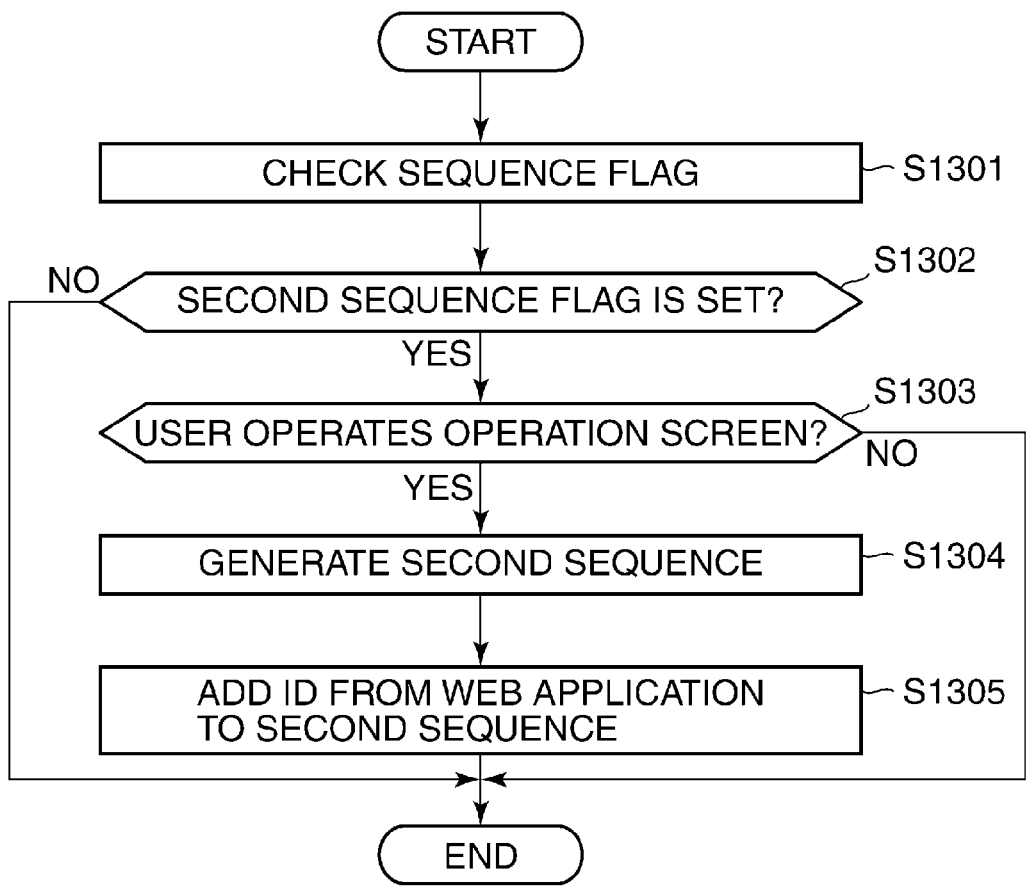
FIG. 13 is a flowchart showing a second sequence process executed by the information processing apparatus (MFP) according to a second embodiment of the present invention.
FIG. 14 is a view showing an example of a sequence setting designation embedded when returning a response to the Web browser from the Web application.

FIG. 13 is a flowchart showing a second sequence process executed by the information processing apparatus (MFP) 101 according to the second embodiment of the present invention.

As mentioned above, when the MFP 101 completes a job, the service provider 440 transmits a job completion notification to the transfer application 430.

When receiving the job completion notification, the transfer application 430 (i.e., the processing module 432) checks the sequence flag as mentioned above (step S1301). Then, the transfer application 430 determines whether the second sequence flag is set (step S1302). When the second sequence flag is not set (NO in the step S1302), the transfer application 430 finishes the second sequence process.

On the other hand, when the second sequence flag is set (YES in the step S1302), the transfer application 430 checks whether the user is operating the UI display unit 207 (FIG. 2) in step S1303. At the time of this check, the transfer application 430 determines whether a back button was pushed down in an operation screen, or whether the UI display unit 207 was operated according to the acquisition state of the operation screen to the Web application 410, for example.

When the user is not operating the UI display unit 207 (NO in the step S1303), the transfer application 430 finishes the second sequence process. Then, the transfer application 430 continues a usual process using the existing processing sequence (sequence 1).

When the user operates the UI display unit 207 (YES in the step S1303), the transfer application 430 generates a second sequence (step S1304). Then, the transfer application 430 adds a unique ID, which is set by the Web application 410, to the generated second sequence (step S1305), and finishes the second sequence process.

After finishing the second sequence process, the transfer application 430 opens a second tab to the Web browser 420, and generates a new sequence (a sequence 2). Then, the Web browser 420 transmits a processing result as a response to the Web application 410 using the new sequence. When receiving the processing result, the Web application 410 transmits HTML data of a completion screen to the Web browser 420 using the new sequence.

Thus, in the second embodiment, when the user is not operating the UI display unit 207, the completion screen according to the existing sequence (sequence 1) is displayed. Then, when the user operates the UI display unit 207, the second sequence (sequence 2) is generated and the completion screen according to the second sequence concerned is displayed. As a result, when the user does not operate, a second sequence is not generated unnecessarily, which reduces loads on the MFP 101 and the server 102.

Next, an example of an information processing apparatus (MFP) according to a third embodiment of the present invention will be described. It should be noted that the configurations of the information processing apparatus (MFP) 101 and the server 102 in the third embodiment are the same as that shown in FIG. 2 through FIG. 4. Here, when Web browser 420 requests acquisition of a completion screen to Web application 410, a completion notification (request) is notified to Web application 410, without opening a new tab.

FIG. 14 is a view showing an example of a sequence setting designation embedded when the Web application 410 replies a response to the Web browser 420.

HTTP-header information on the response that is replied to the Web browser 420 from the Web application 410 includes "Window open" 1401 (tab setting information). The "Window open" 1401 expresses a setting of whether a new tab is opened to execute a request. When the "Window open" 1401 is "ON", the Web browser 420 generates a new tab at the time of a request to the Web application 410. Then, the Web browser 420 notifies a processing completion to the Web application 410, and requests to acquire a completion screen.

On the other hand, when the "Window open" 1401 is "OFF", the Web browser 420 does not generate a new tab. Then, the Web browser 420 notifies only the completion of the job to the Web application 410 without requesting to acquire the completion screen.

Thus, since the third embodiment sets up whether to execute a request by opening a new tab, the number of steps to generate a screen in the Web application 410 can be reduced and communications for a screen acquisition can be reduced, when a processing completion result of the MFP 101 is unnecessary to be displayed on the UI display unit 207.

Although the embodiments of the invention have been described, the present invention is not limited to the above-mentioned embodiments, the present invention includes various modifications as long as the concept of the invention is not deviated.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-092971, filed on Apr. 19, 2011, which is hereby incorporated by reference herein in its entirety.

What is claimed is:

1. An information processing apparatus comprising:
a display control unit configured to,
display a print operation screen for inputting a print instruction based on screen data that is received from an external server, the print operation screen being associated with a tab of a tabbed browser;
a printing unit configured to execute a print process in a case where the print instruction is input by a user on the operation screen; and
a transmitting unit configured to transmit information indicating a completion of the print process to the external server, wherein said display control unit is configured to display a print completion screen based on screen data, the screen data being received from the external server in a case where said transmitting unit has transmitted the information;

wherein said display control unit is configured to display the print completion screen with a different tab of the tabbed browser from the tab with which the print operation screen is associated when another user's operation is performed while executing the print process, and wherein said display control unit is configured to display the print completion screen with the same tab as the tab with which the operation screen is associated when another user's operation is not performed while executing the print process.

2. The information processing apparatus according to claim 1, wherein said printing unit is configured to execute a print process for printing a document selected from a document list displayed on the print operation screen.

3. The information processing apparatus according to claim 1, wherein said printing unit is configured to execute the print process in accordance with a script that makes the information processing apparatus execute printing, the script being received from the external server.

4. A control method for an information processing apparatus comprising:
- a step of receiving screen data from an external apparatus on a network;
- a step of displaying an operation screen based on the screen data received;
- a step of executing a job according to a user's operation on the operation screen;
- a step of transmitting a result of the job executed to the external apparatus;
- a step of receiving screen data showing a completion screen corresponding to the transmitted result of the job from the external apparatus;
- a step of displaying the completion screen with a different tab from the operation screen when another user's operation is performed while executing the job; and
- a step of displaying the completion screen with the same tab as the operation screen when another user's operation is not performed while executing the job.

* * * * *